(12) United States Patent
Mu

(10) Patent No.: US 12,316,457 B2
(45) Date of Patent: May 27, 2025

(54) METHOD AND APPARATUS FOR TRANSMITTING HYBRID AUTOMATIC REPEAT REQUESTS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 734 days.

(21) Appl. No.: 17/609,678

(22) PCT Filed: May 9, 2019

(86) PCT No.: PCT/CN2019/086278
§ 371 (c)(1),
(2) Date: Nov. 8, 2021

(87) PCT Pub. No.: WO2020/223973
PCT Pub. Date: Nov. 12, 2020

(65) Prior Publication Data
US 2022/0321273 A1 Oct. 6, 2022

(51) Int. Cl.
| | |
|---|---|
| *H04W 72/21* | (2023.01) |
| *H04L 1/08* | (2006.01) |
| *H04L 1/1812* | (2023.01) |
| *H04L 5/00* | (2006.01) |
| *H04W 72/0446* | (2023.01) |

(52) U.S. Cl.
CPC .......... *H04L 1/1812* (2013.01); *H04L 1/08* (2013.01); *H04L 5/0012* (2013.01); *H04W 72/0446* (2013.01); *H04W 72/21* (2023.01)

(58) Field of Classification Search
CPC ....... H04L 1/1812; H04L 1/1858; H04L 1/08; H04L 5/0055; H04W 4/70
See application file for complete search history.

(56) References Cited

U.S. PATENT DOCUMENTS

| | | | |
|---|---|---|---|
| 11,737,059 B2 * | 8/2023 | Soriaga ............ | H04L 27/26025 370/336 |
| 2017/0265193 A1 | 9/2017 | Wang et al. | |
| 2018/0206224 A1 | 7/2018 | Hwang et al. | |

FOREIGN PATENT DOCUMENTS

WO   WO 2018171242 A1   9/2018

OTHER PUBLICATIONS

Indonesian Patent Application No. P00202111248, English translation of Office Action dated Nov. 20, 2023, 2 pages.
(Continued)

*Primary Examiner* — Bo Hui A Zhu
(74) *Attorney, Agent, or Firm* — Cozen O'Connor

(57) ABSTRACT

A method for transmitting Hybrid Automatic Repeat reQuests (HARQs) includes: transmitting, HARQs of a plurality of different transmission blocks (TBs) that are alternately transmitted, based on different time domain resources; in which wherein, alternately transmitting the plurality of different TBs includes: cyclically transmitting a TB alternate transmission unit until a total number of repeated transmissions configured for each TB is satisfied, in which the TB alternate transmission unit includes N repeated transmissions of the different TBs and N is greater than 0 and less than the total number of repeated transmissions configured.

17 Claims, 10 Drawing Sheets

(56) References Cited

OTHER PUBLICATIONS

Russian Patent Application No. 2021135823, Office Action dated Sep. 1, 2022, 8 pages.
Russian Patent Application No. 2021135823, English translation of Office Action dated Sep. 1, 2022, 8 pages.
Indian Patent Application No. 202147056574 Office Action dated Apr. 1, 2022, 7 pages.
European Patent Application No. 19928284.9 extended Search and Opinion dated Apr. 22, 2022, 10 pages.
Lenovo, et al. "Design of scheduling of multiple DL/UL transport blocks for MTC"; 3GPP TSG RAN WG1 Meeting #96bis R1-19021x, Apr. 2019; 5 pages.

* cited by examiner

METHOD AND APPARATUS FOR TRANSMITTING HYBRID AUTOMATIC REPEAT REQUESTS, AND STORAGE MEDIUM

CROSS-REFERENCE TO RELATED APPLICATION

This application is a national phase of International Application No. PCT/CN2019/086278, filed on May 9, 2019, the content of which is hereby incorporated by reference in its entirety.

TECHNICAL FIELD

The disclosure relates to the field of wireless communication technologies, in particular to a method for transmitting Hybrid Automatic Repeat reQuests (HARQs), an apparatus for transmitting HARQs and a storage medium.

BACKGROUND

Machine type communication (MTC) is a typical example of cellular Internet of Things (IoT) technologies. Currently, MTC has been widely applied in smart cities (e.g., meter reading), smart agriculture (e.g., collection of information such as temperature and humidity), smart transportation (e.g., bicycle sharing) and many other fields.

In MTC, during alternate transmission scheduling of transmission blocks (TBs), transmissions of multiple TBs are interleaved with each other. If there is a TB that is transmitted unsuccessfully, a HARQ may be transmitted. However, for devices such as MTC terminals, abnormalities occur when transmitting the HARQ, which leads to a problem of high failure rate of transmitting the HARQ.

SUMMARY

In view of this, embodiments of the disclosure provide a method for transmitting HARQs, an apparatus for transmitting HARQs and a storage medium.

According to a first aspect of embodiments of the disclosure, a method for transmitting HARQs is provided. The method includes: transmitting, HARQs of a plurality of different TBs that are alternately transmitted, based on different time domain resources; in which, alternately transmitting the plurality of different TBs includes: cyclically transmitting a TB alternate transmission unit until a total number of repeated transmissions configured for each TB is satisfied, the TB alternate transmission unit includes N repeated transmissions of the different TBs and N is greater than 0 and less than the total number of repeated transmissions configured.

According to a second aspect of embodiments of the disclosure, a method for transmitting HARQs is provided. The method includes: generating HARQ information by performing predetermined encoding on HARQs of a plurality of different TBs that are alternately transmitted and transmitting the HARQ information; in which, alternately transmitting the plurality of different TBs includes: cyclically transmitting a TB alternate transmission unit until a total number of repeated transmissions configured for each TB is satisfied, the TB alternate transmission unit includes N repeated transmissions of the different TBs and N is greater than 0 and less than the total number of repeated transmissions configured.

According to a third aspect embodiments of the disclosure, a method for transmitting HARQs is provided. The method includes: receiving HARQ information that is obtained by performing predetermined encoding on HARQs of a plurality of different TBs that are alternately transmitted; obtaining a decoding sequence by decoding the HARQ information based on a demodulating mode corresponding to the predetermined encoding; and determining demodulating states of the plurality of different TBs based on the decoding sequence; in which, alternately transmitting the plurality of different TBs includes: cyclically transmitting a TB alternate transmission unit until a total number of repeated transmissions configured for each TB is satisfied, the TB alternate transmission unit includes N repeated transmissions of the different TBs and N is greater than 0 and less than the total number of repeated transmissions configured.

According to a fourth aspect of embodiments of the disclosure, a storage medium is provided. The storage medium stores an executable program. When the executable program is executed by a processor, the method for transmitting the HARQs according to the first aspect is performed.

According to a fifth aspect of embodiments of the disclosure, a storage medium is provided. The storage medium stores an executable program. When the executable program is executed by a processor, the method for transmitting the HARQs according to the second aspect is performed.

According to a sixth aspect of embodiments of the disclosure, a storage medium is provided. The storage medium stores an executable program. When the executable program is executed by a processor, the method for transmitting the HARQs according to the third aspect is performed.

According to a seventh aspect of embodiments of the disclosure, an apparatus for transmitting HARQs is provided. The apparatus includes a processor, a memory and an executable program stored on the memory and capable of being performed by the processor. When the processor executes the executable program, the method for transmitting the HARQs according to the first aspect is performed.

According to an eighth aspect of embodiments of the disclosure, an apparatus for transmitting HARQs is provided. The apparatus includes a processor, a memory and an executable program stored on the memory and capable of being performed by the processor, and when the processor executes the executable program, the method for transmitting the HARQs according to the second aspect is performed.

According to a ninth aspect of embodiments of the disclosure, an apparatus for transmitting HARQs is provided. The apparatus includes a processor, a memory and an executable program stored on the memory and capable of being performed by the processor, and when the processor executes the executable program, the method for transmitting the HARQs according to the third aspect is performed.

The method for transmitting the HARQs, the apparatus for transmitting the HARQs and the storage medium, provided in the embodiments of the disclosure, may transmit, the HARQs of the plurality of different TBs that are alternately transmitted, based on the different time domain resources. By adopting the different time domain resources for transmitting the HARQs, overlap of transmission durations of the HARQs of the plurality of different TBs is reduced and complexity of transmitting the HARQs on the time domain for the device which transmits the HARQs is reduced. Therefore, the demand on the processing capacity of the device for transmitting the HARQs is reduced, the success rate of transmitting the HARQs is increased and the stability of the device for transmitting the HARQs is improved.

It is to be understood that both the foregoing general description and the following detailed description are exemplary and explanatory only and are not restrictive of the embodiments of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

Figure 1:
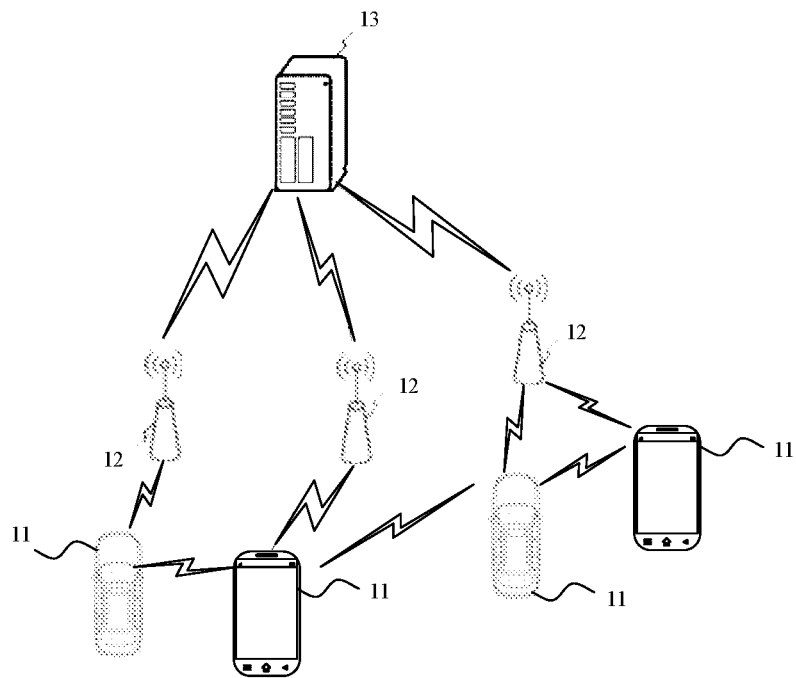
FIG. 1 is a schematic diagram of a wireless communication system according to an exemplary embodiment.

FIG. 1 is a schematic diagram of a wireless communication system according to an exemplary embodiment. As illustrated in FIG. 1, the wireless communication system is a communication system based on cellular mobile communication technologies. The wireless communication system may include terminals 11 and base stations 12.

The terminal 11 may be a device that provides voice and/or data connectivity to a user. The terminal 11 can communicate with one or more core networks via a radio access network (RAN). The terminal 11 can be an IoT terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 11 may also be an unmanned aircraft. Alternatively, the terminal 11 may also be an in-vehicle device, for example, a trip computer having a wireless communication function or a wireless communication device connected to the trip computer. Alternatively, the terminal 11 may also be a roadside device, for example, a street lamp, a signal lamp or other roadside device having the wireless communication function.

The base station 12 may be a network side device in the wireless communication system. The wireless communication system may be the 4$^{th}$ generation mobile communication (4G) system, also known as the long term evolution (LTE) system. The wireless communication system may also be the 5$^{th}$ generation mobile communication (5G) system, also known as the new radio (NR) system or 5G NR system. Alternatively, the wireless communication system may also be a next-generation system of the 5G system. The access network in the 5G system can be called the new generation-radio access network (NG-RAN). The wireless communication system may also be the MTC system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. The embodiment of the disclosure does not limit the specific implementation manner of the base station 12.

A wireless link can be established between the base station 12 and the terminal 11 through a wireless air interface. In different embodiments, the wireless air interface is a wireless air interface based on the 4G standard. Alternatively, the wireless air interface is a wireless air interface based on the 5G standard, for example, the wireless air interface is a NR. The wireless air interface can also be a wireless air interface based on a standard of next generation mobile communication network technology based on the 5G standard.

In some embodiments, an end to end (E2E) link may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in the embodiments of the disclosure.

The execution subjects involved in the embodiments of the disclosure include, but are not limited to devices that use MTC for communication transmission, such as MTC clients like MTC terminals and IoT terminals.

Figure 2:
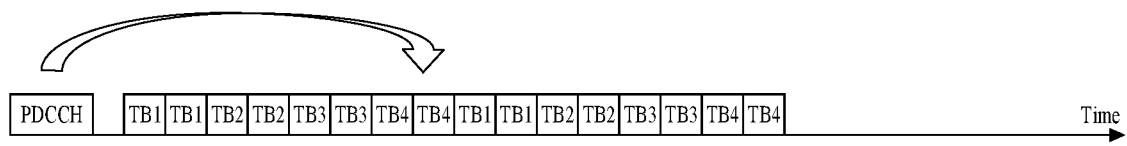
FIG. 2 is a schematic diagram of alternate transmissions of TBs according to an exemplary embodiment.

The application scenario of the embodiments of the disclosure is that in view of weak signal coverage of MTC and the relatively low cost and low processing capacity of MTC devices, MTC uses a mechanism of transmission block (TB) alternate transmission during multi-TB scheduling, that is, alternately and repeatedly transmitting different TBs. In FIG. 2, a sequence of TBs may be alternately and repeatedly transmitted.

Figure 3:
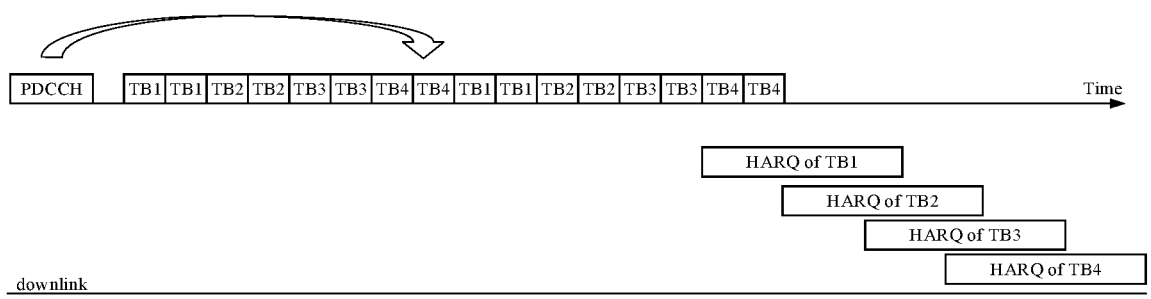
FIG. 3 is a schematic diagram of time overlapping of HARQs according to an exemplary embodiment.

According to the method for transmitting the TBs alternatively, the end time of transmitting each TB is relatively close. According to the method for transmitting HARQs adopted in the relevant MTC, as illustrated in FIG. 3, the times of transmitting HARQs of TBs overlaps, thus the complexity of processing the HARQ at the device for transmitting the HARQs such as the MTC client is increased. Due to performance limitation of the device for transmitting the HARQs, the device for transmitting the HARQs may even fail to operate.

Figure 4:
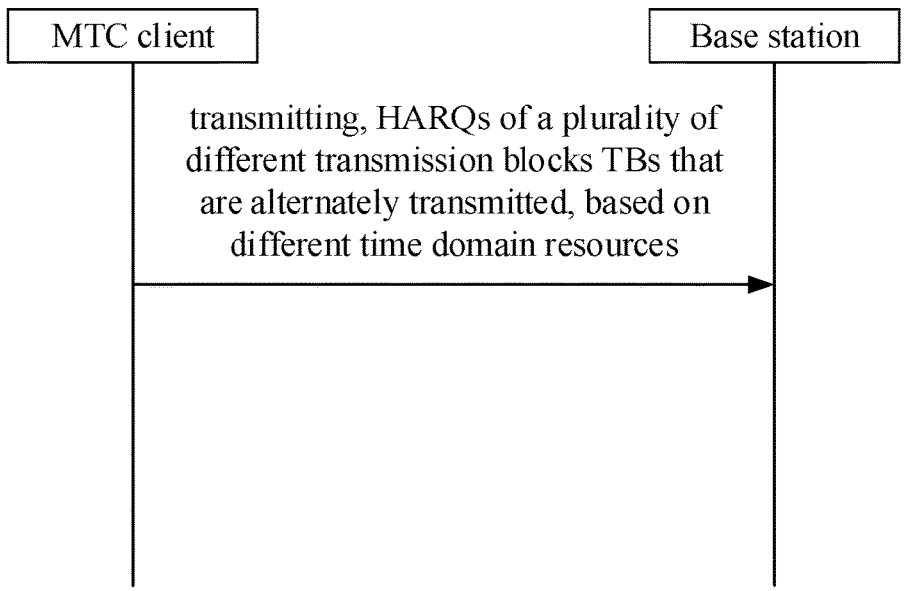
FIG. 4 is a flowchart of a method for transmitting HARQs according to an exemplary embodiment.

FIG. 4 is a flowchart of a method for transmitting HARQs according to an exemplary embodiment. The method for transmitting the HARQs can be applied to the wireless communication devices such as MTC clients.

The method includes: transmitting, HARQs of a plurality of different TBs that are alternately transmitted, based on different time domain resources.

Alternately transmitting the plurality of different TBs includes: cyclically transmitting a TB alternate transmission unit until a total number of repeated transmissions configured for each TB is satisfied, in which the TB alternate transmission unit includes N repeated transmissions of the different TBs and N is greater than 0 and less than the total number of repeated transmissions configured.

The TB alternate transmission unit includes at least two TBs and these TBs are sorted in a certain order to form the TB alternate transmission unit.

The HARQ transmitting terminal, such as the MTC client, transmits the HARQs of different TBs based on different time domain resources, which can reduce the overlap of transmitting times of the HARQs of the different TBs. The HARQ transmitting terminal processes one HARQ in the same time domain, the complexity of transmitting the HARQs on the time domain by the transmitting terminal is reduced. Therefore, the demand on the processing capacity of the HARQ transmitting terminal is reduced, the success rate of transmitting the HARQs is increased and the stability of the HARQ transmitting terminal is improved. One HARD can be transmitted on one time domain resource.

A TB is a kind of content block. Different TBs contain different data content. As illustrated in FIG. 2, the total number of repeated transmissions for a TB is 4. In a TB alternate transmission unit, a TB is repeatedly transmitted for N times. In FIG. 2, N is 2. The data content of TB1 transmitted for 4 total number of repeated transmissions are the same. The data content in TB1 and TB2 are different. The content of TB1 transmitted 4 times is the same in each transmission.

Through alternate transmissions, received powers of the same TB can be accumulated, thereby increasing the decoding success rate of a TB receiving terminal.

In the embodiments, the HARQs of the plurality of different TBs that are alternately transmitted are transmitted based on the different time domain resources, which prevents the HARQs of the different TBs from occupying the same time domain resource (which may lead to the complexity introduced by orthogonal transmission in the time domain). Therefore, the processing complexity of the HARQ transmitting terminal when transmitting the HARQs is reduced, especially for terminals such as MTC transmitting terminals with weak processing capabilities, which can reduce the transmission failure caused by high transmission complexity of the HARQs and improve the success rate of transmitting the HARQs.

In some embodiments, one TB has one HARQ.

In some embodiments, one TB that is repeatedly transmitted for multiple times may have multiple HARQs. If one TB has one HARQ, transmission resources occupied by unnecessary HARQs are reduced and transmission overhead is saved.

In the TB alternate transmission in FIG. 2, the TB alternate transmission unit is transmitted twice and the TB is repeatedly transmitted twice in the TB alternate transmission unit. The data content of the TB that is repeatedly transmitted may be the same, for example, the data content of TB1 that is transmitted for four times are the same.

In the alternate transmission, the TB will be repeatedly transmitted for multiple times. The HARQ transmitting terminal, such as the MTC client, will demodulate the TB received for multiple times after receiving the TB transmitted for multiple times. The demodulation result is transmitted back to the TB transmitting terminal through the HARQ. The HARQ includes acknowledgement (ACK) and negative acknowledgement (NACK).

In detail, if the demodulation result is correct, ACK is fed back, and/or, if the demodulation result is incorrect, NACK is fed back.

For another example, if the demodulation result is correct, the HARQ is not sent, and if the demodulation result is incorrect, NACK is sent. For yet another example, if the demodulation result is correct, the HARQ is sent, and if the demodulation result is incorrect, NACK is not sent. In this way, the HARQ receiving terminal can determine whether the TB has been successfully transmitted based on whether the HARQ is received on the predetermined transmission resource.

As illustrated in FIG. 2, in the alternate repeated transmission, TB1 is transmitted for the total number of repeated transmissions. In FIG. 2, the total number of repeated transmissions of TB is 4. The HARQ transmitting terminal analyzes the TB1 repeatedly transmitted for 4 times and sends a HARQ to the base station as a feedback on whether the TB1 has been demodulated correctly, and a HARQ indicates a final transmission result of the TB1 repeatedly transmitted for 4 times. In the alternate transmission of TB1 to TB4 in FIG. 2, the HARQ transmitting terminal will transmit a total of 4 HARQs corresponding to TB1 to TB4 to the base station.

Different time domain resources mean that the used time domain resources fed back by HARQs of different TBs do not overlap with each other in the time domain.

Figure 5:
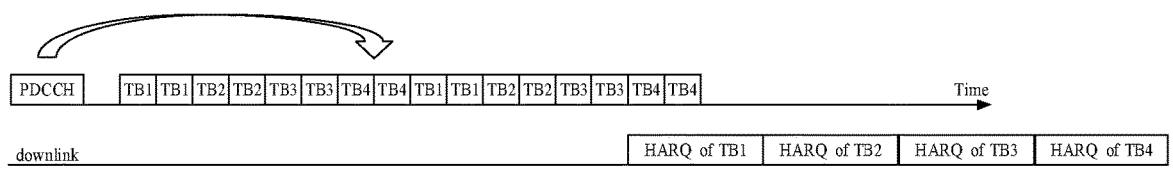
FIG. 5 is a schematic diagram of transmitting HARQs according to an exemplary embodiment.

As illustrated in FIG. 5, the HARQs of the different TBs are transmitted based on the different time domain resources, overlap of transmission durations of the HARQs of the different TBs is reduced, and since the HARQ transmitting terminal only needs to process one HARQ in the same time domain, the complexity of transmitting the HARQs on the time domain by the HARQ transmitting terminal is reduced. Therefore, the demand on the processing capacity of the HARQ transmitting terminal is reduced, the success rate of transmitting the HARQs is increased and the stability of the HARQ transmitting terminal is improved.

In some embodiments, the HARQs of the different TBs are transmitted on the PUCCH based on the different time domain resources.

The HARQ is carried on the PUCCH for transmission. Therefore, the transmission of the HARQs in different time domains can be realized by calling the PUCCH of different time domain resources.

In some embodiments, transmitting the HARQs of the different TBs on the PUCCH based on the different time domain resources in the following six modes.

In the first mode, the HARQs of the different TBs are transmitted on the PUCCH based on the different time domain resources by using the same frequency domain resources.

In the second mode, the HARQs of the different TBs are transmitted on the PUCCH based on the different time domain resources by using the same code domain resources.

In the third mode, the HARQs of the different TBs are transmitted on the PUCCH based on the different time domain resources by using the same frequency domain resources and the same code domain resources.

In the fourth mode, the HARQs of the different TBs are transmitted on the PUCCH based on the different time domain resources by using different frequency domain resources.

In the fifth mode, the HARQs of the different TBs are transmitted on the PUCCH based on the different time domain resources by using different code domain resources.

In the sixth mode, the HARQs of the different TBs are transmitted on the PUCCH based on the different time domain resources by using different frequency domain resources and different code domain resources.

Transmission resources are configured for the PUCCH and these transmission resources can be classified into: time domain resources, frequency domain resources and code domain resources. For example, different time domain resources correspond to different times of transmitting information on the PUCCH.

Different frequency domain resources correspond to different frequency transmission subbands or carriers of the PUCCH.

Different code domain resources indicate that PUCCH resources can be divided in different formats.

The transmission of the HARQ only needs to satisfy the time domain difference, which can prevent overlap of times of transmitting the HARQs of the different TBs and reduce the workload of the HARQ transmitting terminal. Therefore, the HARQs of the different TBs can be transmitted on the PUCCH of the same frequency domain, the same code domain, or the same frequency and code domain.

In some embodiments, transmitting the HARQs of the plurality of different TBs includes transmitting M repeated transmissions of the HARQ of each TB sequentially, where M is a total number of repeated transmissions of the HARQ of each TB.

In the TB alternate transmission, one TB corresponds to one HARQ and each HARQ can be transmitted only once. As illustrated in FIG. 5, four HARQs corresponding to TB1 to TB4 respectively are transmitted once in different time domains.

Figure 6:
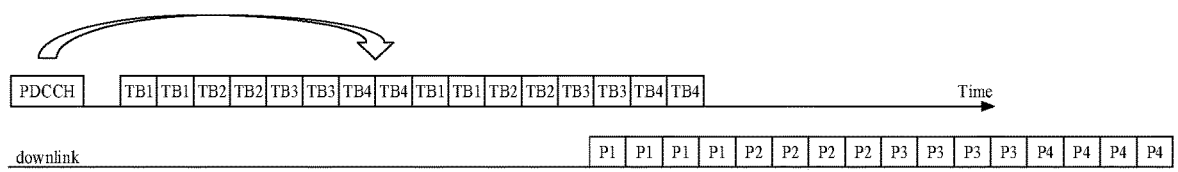
FIG. 6 is a schematic diagram of transmitting HARQs according to an exemplary embodiment.

As illustrated in FIG. 6, each HARQ can also be transmitted for M times and the HARQs that are repeatedly transmitted can be demodulated together, thereby improving the receiving and demodulating success rate of the base station. In FIG. 6, M is 4, and P1, P2, P3, and P4 represent the HARQ of TB1, TB2, TB3, and TB4, respectively. P1, P2, P3, and P4 are repeatedly transmitted for 4 times.

In some embodiments, the HARQs of the different TBs are alternately transmitted.

The HARQ of each TB can be alternately and repeatedly transmitted. The HARQ alternate transmission unit is established by the HARQs of the different TBs based on a sequence of the different TBs in the TB alternate transmission unit. The HARQ alternate transmission unit is transmitted for multiple times.

In some embodiments, the HARQ alternate transmission unit is cyclically transmitted until the total number of repeated transmissions configured for each HARQ is satisfied. The HARQ alternate transmission unit includes X repeated transmissions of each HARQ, where X is greater than 0 and less than the total number of repeated transmissions configured for each HARQ.

Figure 7:
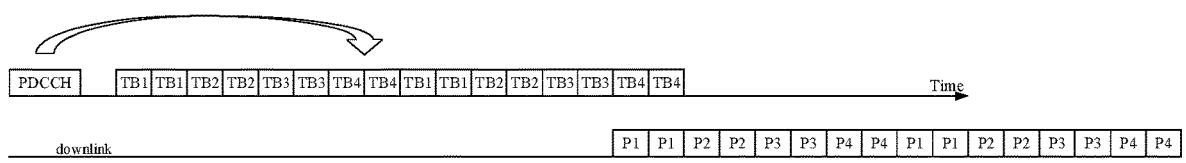
FIG. 7 is a schematic diagram of transmitting HARQs according to an exemplary embodiment.

The HARQ of each TB can be alternately and repeatedly transmitted. In detail, the HARQs of different TBs can be used to establish the HARQ alternate transmission unit based on the sequence of each TB in the TB alternate transmission unit. The HARQ alternate transmission unit can be transmitted for multiple times. One HARQ can be repeatedly transmitted for X times in one HARQ alternate transmission unit. As illustrated in FIG. 7, the HARQ corresponding to TB1 can be retransmitted for X times, where X is 2, and then the HARQs of TB2, TB3, and TB4 can be retransmitted for X times sequentially. When the X repeated transmissions of the HARQs of all the TBs are finished, the HARQs of all the TBs are retransmitted again until a preset end condition is satisfied. For example, the end condition may be the number of transmitting the HARQs reaches the predetermined total number of repeated transmissions. In FIG. 7, the total number of repeated transmissions of the HARQ is 4. The sequence of the HARQs of the different TBs in the HARQ alternate transmission unit may be arranged according to the sequence of the different TBs corresponding to the HARQs, in the TB alternate transmission unit.

In some embodiments, the number of repeated transmissions of the HARQ in the HARQ alternate transmission unit is determined based on the received high-level signaling; or, the number of repeated transmissions of the HARQ in the HARQ alternate transmission unit is determined based on the number of repeated transmissions of the TB in the TB alternate transmission unit; or, the number of repeated transmissions of the HARQ in the HARQ alternate transmission unit is determined based on the frequency hopping unit of the PUCCH.

The number of repeated transmissions of the HARQ is determined based on the received high-level signaling. It is also possible to determine the number of transmissions of the HARQ based on the number of transmissions of the TB in the alternate transmission process, for example, the number of transmissions of the TB is the same as the number of transmissions of the HARQ or linear correspondence.

The frequency hopping unit is configured to configure a number of consecutive repeated transmissions of the PUCCH in a frequency domain. The size of the frequency hopping unit can be configured by the base station. For example, the size of the frequency hopping unit is configured to be Q times. The physical meaning is that after Q number of repeated transmissions of the PUCCH on a certain frequency band, it needs to hop to another frequency band and to perform M number of repeated transmissions of the PUCCH on the another frequency band. Therefore, the number of transmitting the HARQs in the HARQ alternate transmission unit can be set to be aligned with the size of the frequency hopping unit, that is, X is equal to Q.

In some embodiments, different HARQs are transmitted by using the different time domain resources after a first time interval in which transmission of the first one of the TBs is finished. Or, the different HARQs are transmitted by using the different time domain resources after a second time interval in which transmission of the last one of the TBs is finished.

Taking the HARQ in FIG. 6 as an example, the HARQ transmission can be started at 4 ms after the end of TB1. Taking the HARQ in FIG. 7 as an example, the entire alternate transmission may take a transmission end time point of the last TB as a reference point, and start transmission at, for example 4 ms, after the end of the transmission of the last TB. In this way, time can be reserved for HARQ transmission configuration to satisfy requirements of sequence.

The HARQs of the different TBs are transmitted based on the different time domain resources, to reduce overlap of transmission times of the HARQs of the different TBs. The HARQ transmitting terminal only needs to process one HARQ in the same time domain, which reduces the complexity of the HARQ transmitting terminal in the time domain when transmitting the HARQs, reduces the demand on the processing capability of the HARQ transmitting terminal, improves the success rate of transmitting the HARQs and improves the stability of the HARQ transmitting terminal.

Figure 8:
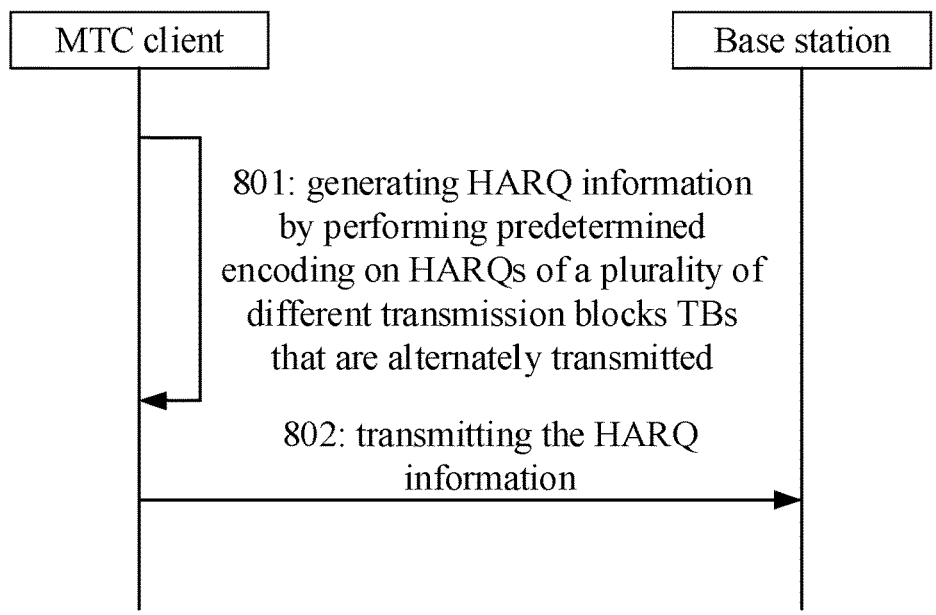
FIG. 8 is a flowchart of a method for transmitting HARQs according to an exemplary embodiment.

As illustrated in FIG. 8, a method for transmitting HARQs may be provided in an exemplary embodiment. The method can be applied to wireless communication devices such as MTC clients. The method includes the following.

In block 801, HARQ information is generated by performing predetermined encoding on HARQs of a plurality of different TBs that are alternately transmitted.

In block 802, the HARQ information is transmitted.

Alternately transmitting the plurality of different TBs includes cyclically transmitting a TB alternate transmission unit until a total number of repeated transmissions configured for each TB is satisfied, in which the TB alternate transmission unit includes N repeated transmissions of the different TBs and N is greater than 0 and less than the total number of repeated transmissions configured.

The TB alternate transmission unit includes at least two TBs and these TBs are sorted in a certain order to form the TB alternate transmission unit.

The HARQ transmitting terminal, such as the MTC client, demodulates and decodes the TBs after receiving the different TBs, and confirms whether the TBs are successfully decoded, then encodes the HARQ of each TB to obtain HARQ information, and transmits the HARQ information, which can reduce the overlap of transmitting times of HARQs. Therefore, the complexity of processing the HARQs by the HARQ transmitting terminal is reduced, the demand on the processing capacity of the HARQ transmitting terminal is reduced, the success rate of transmitting the HARQs information is increased and the stability of the HARQ transmitting terminal is improved. One HARD can be transmitted on one time domain resource.

TB is a kind of content block. Different TBs contain different data content. As illustrated in FIG. 2, the total number of repeated transmissions for a TB is 4. In a TB alternate transmission unit, a TB is repeatedly transmitted for N times. In FIG. 1, N is 2. The data content of TB1 transmitted for 4 total number of repeated transmissions are the same. The data content in TB1 and TB2 are different. The content of TB1 transmitted for 4 times are the same.

In some embodiments, one TB has one HARQ.

Certainly, in other embodiments, one TB that is repeatedly transmitted for multiple times may have multiple HARQs. If one TB has one HARQ, transmission resources occupied by unnecessary HARQs are reduced and transmission overhead is saved.

In the TB alternate transmission in FIG. 2, the TB alternate transmission unit is transmitted twice and the TB is repeatedly transmitted twice in the TB alternate transmission unit. The data content of the TB that is repeatedly transmitted are the same, for example, the data content of TB1 that is transmitted for four times are the same.

In the alternate transmission, the TB will be repeatedly transmitted for multiple times. The HARQ transmitting terminal will demodulate the TB received for multiple times after receiving the TB transmitted for multiple times. The demodulation result is transmitted back to the TB transmitting terminal through the HARQ. The HARQ includes: ACK and NACK.

In detail, if the demodulation result is correct, ACK is fed back, and/or, if the demodulation result is incorrect, NACK is fed back.

As illustrated in FIG. 2, TB1 is transmitted for 4 times in alternate repeated transmissions. The HARQ transmitting terminal analyzes the TB1 transmitted repeatedly for 4 times and sends a HARQ to the base station to feed back whether TB1 is correctly demodulated. In the alternate transmission of TB1 to TB4 in FIG. 2, the HARQ transmitting terminal will transmit a total of 4 HARQs corresponding to TB1 to TB4 to the base station.

The HARQs of multiple TBs can be pre-encoded to obtain HARQ information encoded by the HARQs. The content of the HARQ information is determined by the predetermined encoding, which can present the demodulation results of the TBs, for example, on whether the TBs are demodulated correctly.

There can be one piece of HARQ information, so that in the process of transmitting the HARQ information, which can reduce the overlap of transmitting times of HARQs. Therefore, the complexity of processing the HARQs by the HARQ transmitting terminal is reduced, the workload of the HARQ transmitting terminal is reduced and the stability of the HARQ transmitting terminal is improved.

In some embodiments, the HARQ information is obtained by performing a bitwise logical AND operation on the HARQs of the plurality of different TBs.

Figure 9:
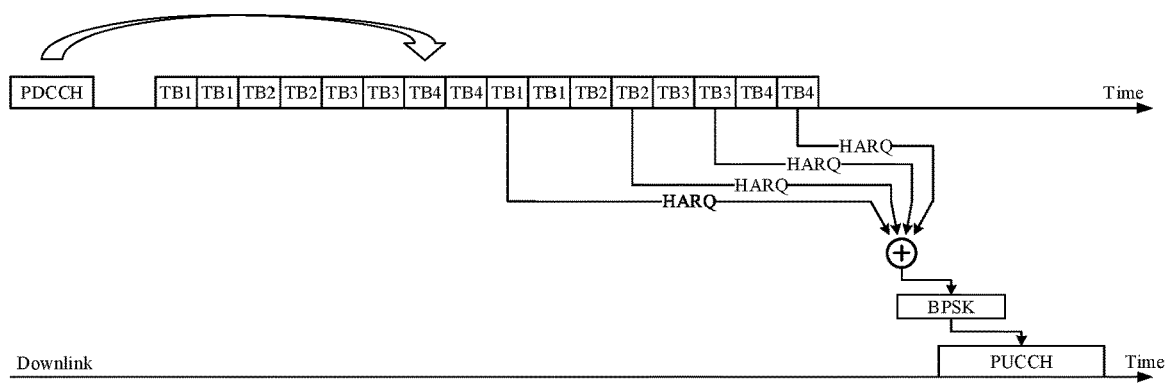
FIG. 9 is a schematic diagram of transmitting HARQs according to an exemplary embodiment.

For example, as illustrated in FIG. 9, the HARQ corresponding to each of TB1 to TB4 may be subjected to the bitwise logical AND operation, so as to obtain the HARQ information presenting the overall demodulation situation of TB1 to TB4. For example, if the HARQ of TB1 is "0", it means the demodulation is failed. If the HARQ of each of TB2, TB3, and TB4 is "1", it means the demodulation is successful. Then after performing the bitwise logical AND operation on all the HARQs, the HARQ information "0" is obtained. After the base station receives the HARQ information, it is known that at least one of TB1 to TB4 has failed to be demodulated, and TB1 to TB4 can be transmitted again.

In some embodiments, the HARQ information modulated by the BPSK is transmitted.

BPSK can be used to modulate the HARQ information to satisfy the requirements of the PUCCH, and the HARQ information can be carried on the PUCCH for transmission.

The HARQs are encoded into one piece of HARQ information, and transmitted through the PUCCH, which avoids the problem of time overlap of the PUCCH carried by the HARQ, and reduces the workload of the HARQ transmitting terminal.

In some embodiments, different groups of HARQs are obtained by performing the bitwise logical AND operation based on groups on the HARQs of the plurality of the different TBs, and the HARQ information is obtained by combining the different groups of HARQs.

Figure 10:
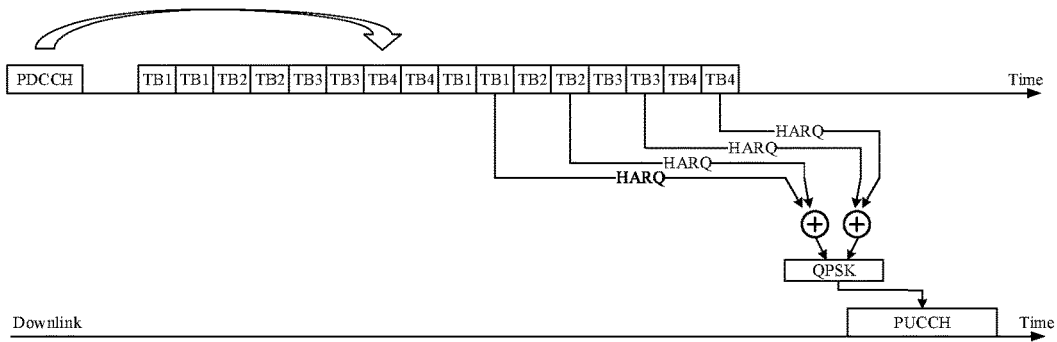
FIG. 10 is a schematic diagram of transmitting HARQs according to an exemplary embodiment.

For example, the HARQs of the different TBs can be classified into two groups. As illustrated in FIG. 10, the HARQ corresponding to each of TB1 to TB4 can be classified into two groups. The HARQ of TB1 and the HARQ of TB2 are combined into one group and the bitwise logical AND operation is performed to obtain a 1-bit result. The HARQ of TB3 and the HARQ of TB4 are combined into another group and the bitwise logical AND operation is performed to obtain a 1-bit result. The two groups are combined to generate 2-bit HARQ information by combining the two 1-bit results. For example, if the HARQ of TB1 is "0", it means the demodulation is failed. If the HARQ of each of TB2, TB3 and TB4 is "1", it means the demodulation is successful. Then the bitwise logical AND operation is performed on the HARQ of TB1 and the HARQ of TB2 to obtain the HARQ information "1". After the bitwise logical AND operation is performed on the HARQ of TB3 and the HARQ of TB4, the HARQ information "1" is obtained. After the base station receives the HARQ information, it can be known that at least one of TB1 and TB2 has failed to be demodulated, and TB1 and TB2 can be retransmitted. It is possible to pre-appoint a plurality of the TBs to constitute a group.

In some embodiments, the HARQ information modulated by the QPSK is transmitted.

For the 2-bit HARQ information, the QPSK can be used to modulate the HARQ information to satisfy the requirements of the PUCCH, and the HARQ information is carried on the PUCCH for transmission.

The HARQs are encoded into one piece of HARQ information, and transmitted through the PUCCH, which avoids the problem of time overlap of the PUCCH carried by the HARQs, and reduces the workload of the HARQ transmitting terminal.

In some embodiments, the PUCCH is used to transmit the HARQ information, and the HARQ information is transmitted on the PUCCH after the third time interval after the transmission of the last TB is finished.

The transmission time of the HARQ information takes the transmission end time point of the last TB as the reference point, and the transmission starts at, for example 4 ms, after the transmission of the last TB. Moreover, time can be reserved for HARQ coding.

In this way, it can be ensured that the HARQ information is transmitted after the transmission of all the TBs is finished, and the occurrence of consequence confusion is reduced.

There can be one piece of HARQ information, so that in the process of transmitting the HARQ information, the time overlap of the HARQs of the TBs is reduced, the complexity of processing the HARQs by the HARQ transmitting terminal and the processing load of the HARQ transmitting terminal is reduced to improve the stability of the HARQ transmitting terminal.

Figure 11:
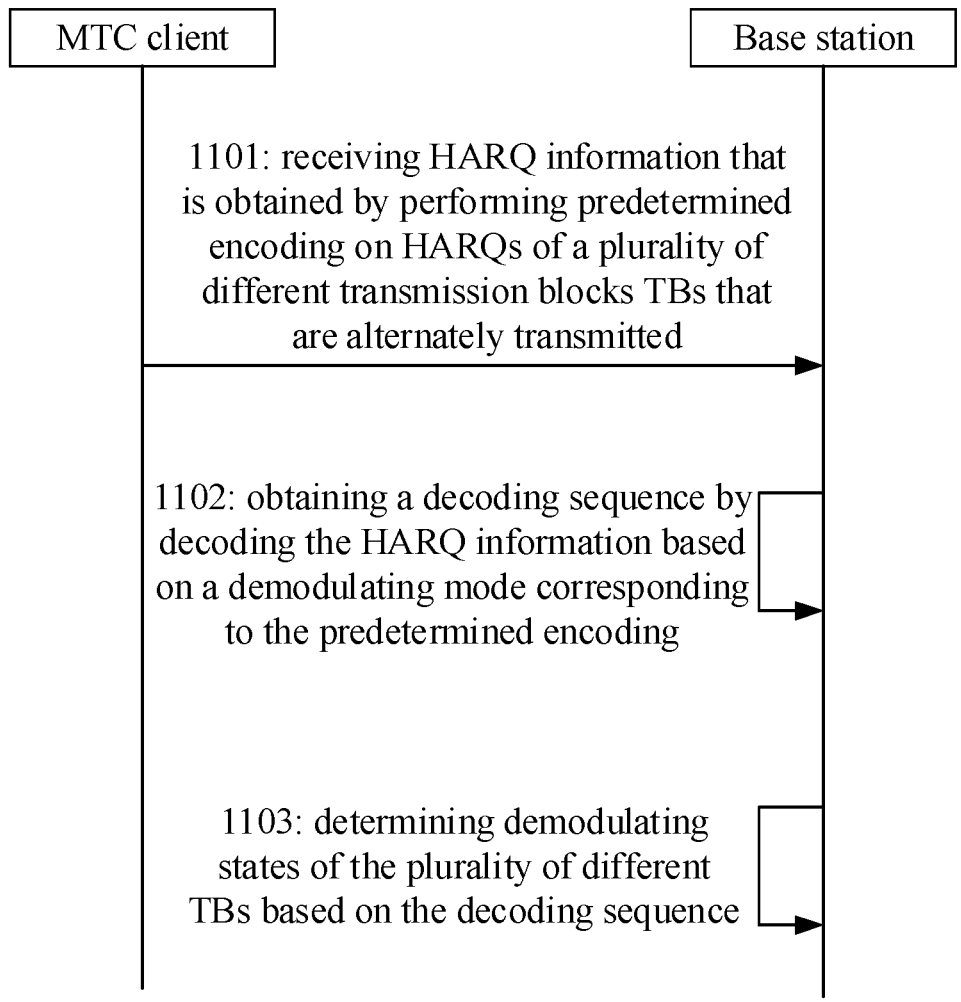
FIG. 11 is a flowchart of a method for transmitting HARQs according to an exemplary embodiment.

As illustrated in FIG. 11, a method for transmitting HARQs may be provided in an exemplary embodiment, which can be applied to the base station of the MTC system, but is also limited to the base station of the system. The method includes the following.

In block 1101, HARQ information that is obtained by performing predetermined encoding on HARQs of a plurality of different TBs that are alternately transmitted, is received.

In block 1102, a decoding sequence is obtained by decoding the HARQ information based on a demodulating mode corresponding to the predetermined encoding.

In block 1103, demodulating states of the plurality of different TBs are determined based on the decoding sequence.

Alternately transmitting the plurality of different TBs includes cyclically transmitting a TB alternate transmission unit until a total number of repeated transmissions configured for each TB is satisfied, in which the TB alternate transmission unit includes N repeated transmissions of the different TBs and N is greater than 0 and less than the total number of repeated transmissions configured.

The TB alternate transmission unit includes at least two TBs and these TBs are sorted in a certain order to form the TB alternate transmission unit.

The TB alternate transmission unit may be transmitted by the TB transmitting terminal such as the base station. The HARQ transmitting terminal such as the MTC client, after receiving multiple different TBs, decodes the TBs, obtains a piece of HARQ information from the HARQ of each TB through the predetermined encoding, and transmits the HARQ information after modulating by the modulation method corresponding to the predetermined encoding, which can reduce the time overlap of the HARQs, reduce the complexity of processing the HARQs by the HARQ transmitting terminal, and reduce the performance requirements of the HARQ transmitting terminal. In turn, the success rate of transmitting the HARQ information is improved and the stability of the HARQ transmitting terminal is improved. A HARD can be transmitted on a time domain resource. The HARQ information obtained by encoding can present the demodulating states of multiple different TBs.

The HARQ transmitting terminal, such as the base station, decodes the received HARQ information based on a demodulation method corresponding to the predetermined encoding to obtain the decoding sequence. The decoding sequence presents the demodulating states of different TBs.

In some embodiments, if the decoding sequence is a preset sequence, it is determined that the different TBs are successfully received.

The preset sequence can be determined based on the predetermined encoding method. If "1" in the result of the predetermined encoding indicates that different TBs are successfully received, the preset sequence can be set to "1".

In detail, as illustrated in FIG. 9, the HARQ transmitting terminal such as the MTC client can perform the predetermined encoding on the HARQs corresponding to TB1 to TB4, such as logical AND operation, so as to obtain HARQ information representing the overall demodulation states of TB1 to TB4. The HARQ can use "0" to indicate demodulation failed and use "1" to indicate successful demodulation. For example, if the HARQ of each of TB1, TB2, TB3, and TB4 is "1", it means that the demodulation is successful, then the bitwise logical AND operation is performed on all the HARQs to obtain the HARQ information "1", which means TB1, TB2, TB3 and TB4 are demodulated successfully. The preset sequence is set to "1".

When the preset sequence is "1", the HARQ transmitting terminal receives the HARQ information and performs the demodulation to obtain the decoding sequence of "0", which is consistent with the preset sequence, it is considered that at least one TB is successfully demodulated.

In some embodiments, if the decoding sequence is not the preset sequence, it is determined that at least one TB has not been successfully demodulated.

Taking the preset sequence in FIG. 9 above as "1", when one of the HARQs of TB1, TB2, TB3, and TB4 is "0", the HARQ information "0" is obtained after the bitwise logical AND operation performed on all the HARQs, which indicates that at least one of TB1, TB2, TB3, and TB4 has failed to be demodulated.

The HARQ transmitting terminal receives the HARQ information and performs the demodulation to obtain the decoding sequence of "0", which is inconsistent with the preset sequence, and it is considered that at least one TB has not been successfully demodulated.

In some embodiments, if at least one TB is not successfully demodulated, the entire TB alternate transmission unit is retransmitted.

After it is determined that at least one TB in the TB alternate transmission unit is not successfully demodulated, the TB alternate transmission unit may be retransmitted.

In some embodiments, the decoding sequence is obtained by decoding the HARQ information based on a demodulating mode of BPSK or QPSK.

The predetermined encoding can be performing the bitwise logical AND operation on the HARQs of the different TBs to obtain 1-bit HARQ information; or obtaining different groups of HARQs by performing the bitwise logical AND operation based on groups on the HARQs of the plurality of different TBs and combining different groups of HARQs to obtain 2-bit HARQ information.

The 1-bit HARQ information generated after the predetermined encoding can be transmitted according to a BPSK modulation method. Therefore, the BPSK demodulation method is used to decode the HARQ information by the HARQ receiving terminal.

The 2-bit HARQ information generated after the predetermined encoding can be transmitted according to a QPSK modulation method. Therefore, the QPSK demodulation method can be used to decode the HARQ information by the HARQ receiving terminal.

In the embodiments, for the HARQs of the multiple different TBs that are alternately transmitted, the HARQ receiving terminal receives the HARQ information which is obtained by predetermined encoding on the HARQs of the multiple different TBs, and then determine the demodulating states of the different TBs, which prevents the HARQs of the different TBs from occupying the same time domain resource (which may lead to the complexity introduced by orthogonal transmission in the time domain), thereby reducing the processing complexity of the HARQ transmitting terminal when transmitting the HARQs, especially for terminals having weak processing capabilities such as MTC terminals. Therefore, the transmission failure caused by the high transmission complexity of the HARQs can be reduced and the success rate of transmitting the HARQs can be improved.

Several specific examples are provided below in combination with any of the foregoing embodiments.

Example 1, Serial HARQ Transmission

The core of the solution is that only the HARQ of one TB is allowed to be transmitted at the same time.

As illustrated in FIG. 6, in an alternate transmission period, the HARQ of the first TB still follows the original sequence, for example, the HARQ may be fed back starting at 4 ms after the end of TB1.

The HARQ of the TB after TB1 can only be performed after the transmission of the HARQ of the current TB is finished.

Example 2, Alternate HARQ Transmission

The core of the solution is only one HARQ transmission is allowed at the same time.

Similar to the idea of the TB alternate transmission mechanism, the PUCCH carrying the HARQ corresponding to each TB is alternately repeated. As illustrated in FIG. 7, firstly, the HARQ corresponding to TB1 can be transmitted repeatedly for S times, and then the HARQ corresponding to TB2 can be transmitted sequentially, until the HARQ corresponding to the last TB is transmitted repeatedly for S times. After the N repeated transmissions of each TB are finished, S repeated transmissions may be performed again until the HARQs corresponding to all TBs reach the configured number of repeated transmissions. The S repeated transmissions of each HARQ included in each alternate transmission is defined as the size of the HARQ alternate transmission unit. The size S of the HARQ alternate transmission unit can be determined in the following ways.

Method 1: high-level signaling configuration.

Method 2: a mapping relationship is established between sizes of HARQ alternate transmission units and sizes of downlink TB alternate transmission units. The size S of the HARQ alternate transmission unit can be derived according to the size of the configured downlink TB alternate transmission unit. For example, S can be configured to be equal to the size of the TB alternate transmission unit.

Method 3: the size S can be determined based on other characteristics of PUCCH transmission. For example, S is equal to the size of the frequency hopping unit of PUCCH.

The entire HARQ alternate transmission takes the transmission end time point of the last TB as the reference point, and the transmission starts after a certain interval, for example, 4 ms, after the transmission of the last TB.

Example 3: HARQ Binding Transmission

At this time, the HARQs of several TBs can be bundled and then transmitted in one PUCCH. The binding method can be as follows. As illustrated in FIG. 9, 1 bit after performing logical AND on the HARQs of all TBs is generated, and then transmitted in the PUCCH according to the BPSK modulation. Or, as illustrated in FIG. 10, the multi-scheduled TBs are classified into two groups, and the HARQs of the TBs in each group are logically added to form 1 bit, a total of 2 bits may be formed for feedback, and then transmitted in the PUCCH according to the QPSK modulation.

The time of the HARQ after binding can use the transmission end time point of the last TB as the reference point and the transmission will start after a certain interval for example 4 ms after the transmission of the last TB.

In the alternate transmission, the conventional one-to-one feedback is no longer supported and only HARQ bundling transmission is supported. That is, HARQ bundling transmission is used after no configuration is required and HARQ bundling transmission is the default feedback mode in the alternate transmission.

Figure 12:
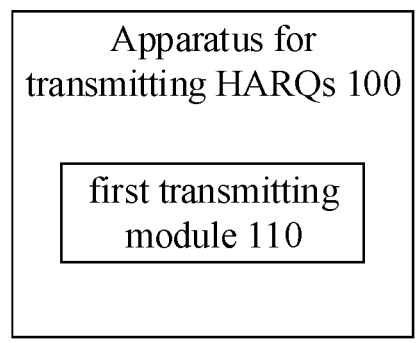
FIG. 12 is a schematic diagram of an apparatus for transmitting HARQs according to an exemplary embodiment.

The embodiments of the disclosure also provide an apparatus for transmitting HARQs. FIG. 12 is a schematic diagram of a structure of an apparatus 100 for transmitting HARQs according to some embodiments of the disclosure. As illustrated in FIG. 12, the apparatus includes a first transmitting module 110.

The first transmitting module 110 is configured to transmit, HARQs of a plurality of different TBs that are alternately transmitted, based on different time domain resources.

Alternately transmitting the plurality of different TBs includes cyclically transmitting a TB alternate transmission unit until a total number of repeated transmissions configured for each TB is satisfied, in which the TB alternate transmission unit includes N repeated transmissions of the different TBs and N is greater than 0 and less than the total number of repeated transmissions configured.

Figure 13:
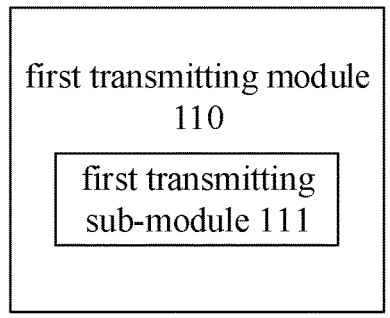
FIG. 13 is a schematic diagram of an apparatus for transmitting HARQs according to an exemplary embodiment.

In an embodiment, as illustrated in FIG. 13, the first transmitting module 110 includes: a first transmitting sub-module 111, configured to transmit M repeated transmissions of the HARQ of each TB sequentially, where M is a total number of repeated transmissions of the HARQ of each TB.

Figure 14:
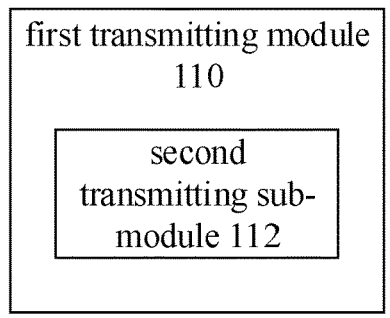
FIG. 14 is a schematic diagram of an apparatus for transmitting HARQs according to an exemplary embodiment.

In an embodiment, as illustrated in FIG. 14, the first transmitting module 110 includes: a second transmitting sub-module 112, configured to transmit the HARQs of the different TBs alternately.

Figure 15:
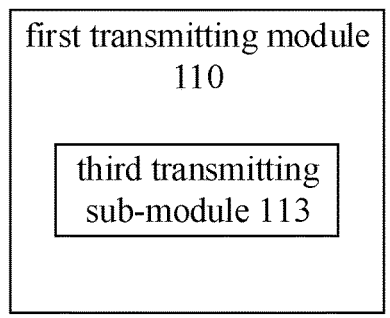
FIG. 15 is a schematic diagram of an apparatus for transmitting HARQs according to an exemplary embodiment.

In an embodiment, as illustrated in FIG. 15, the first transmitting module 110 includes: a third transmitting sub-module 113, configured to cyclically transmit a HARQ alternate transmission unit until a total number of repeated transmissions configured for each HARQ is satisfied.

The HARQ alternate transmission unit includes X repeated transmissions of each HARQ, where X is greater than 0 and less than the total number of repeated transmissions configured for each HARQ.

Figure 16:
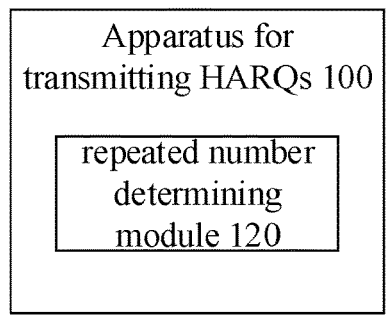
FIG. 16 is a schematic diagram of an apparatus for transmitting HARQs according to an exemplary embodiment.

In an embodiment, as illustrated in FIG. 16, the apparatus 100 further includes: a repeated number determining module 120, configured to: determine a number of repeated transmissions of the HARQ in the HARQ alternate transmission unit based on a received high-level signaling; or, determine a number of repeated transmissions of the HARQ in the HARQ alternate transmission unit based on a number of repeated transmissions of the TB in the TB alternate transmission unit; or determine a number of repeated transmissions of the HARQ in the HARQ alternate transmission unit based on a frequency hopping unit of a PUCCH, in which the frequency hopping unit is configured to configure a number of consecutive repeated transmissions of the PUCCH in a frequency domain.

Figure 17:
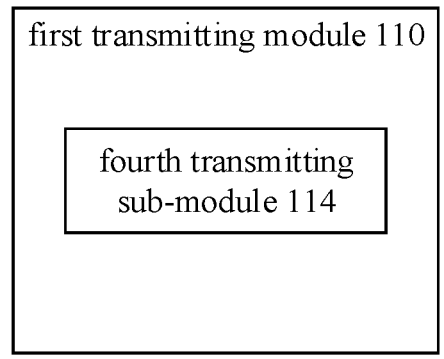
FIG. 17 is a schematic diagram of an apparatus for transmitting HARQs according to an exemplary embodiment.

In an embodiment, as illustrated in FIG. 17, the first transmitting module 110 includes: a fourth transmitting sub-module 114, configured to transmit different HARQs by using the different time domain resources after a first time interval in which transmission of the first one of the TBs is finished; or, transmit different HARQs by using the different time domain resources after a second time interval in which transmission of the last one of the TBs is finished.

Figure 18:
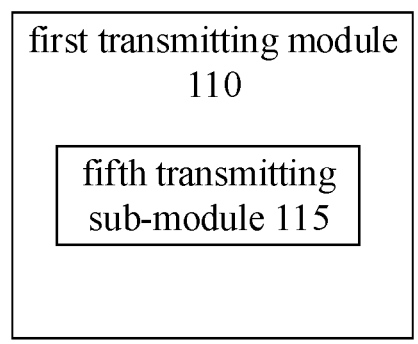
FIG. 18 is a schematic diagram of an apparatus for transmitting HARQs according to an exemplary embodiment.

In an embodiment, as illustrated in FIG. 18, the first transmitting module 110 includes: a fifth transmitting sub-module 115, configured to transmit the HARQs of the different TBs on a PUCCH based on the different time domain resources.

Figure 19:
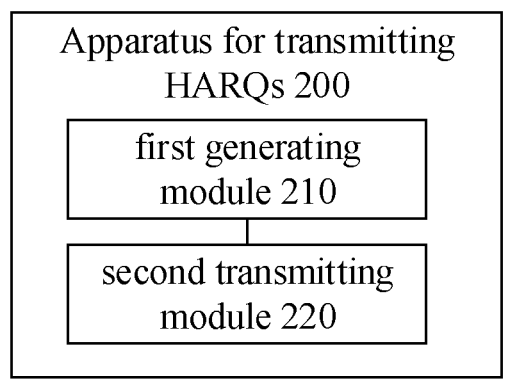
FIG. 19 is a schematic diagram of an apparatus for transmitting HARQs according to an exemplary embodiment.

The embodiments of the disclosure also provide an apparatus for transmitting HARQs. FIG. 19 is a schematic diagram of a structure of an apparatus 200 for transmitting HARQs according to some embodiments of the disclosure.

As illustrated in FIG. 19, the apparatus includes a first generating module 210 and a second transmitting module 220.

The first generating module 210 is configured to generate HARQ information by performing predetermined encoding on HARQs of a plurality of different TBs that are alternately transmitted.

The second transmitting module 220 is configured to transmit the HARQ information;

Alternately transmitting the plurality of different TBs includes: cyclically transmitting a TB alternate transmission unit until a total number of repeated transmissions configured for each TB is satisfied, in which the TB alternate transmission unit includes N repeated transmissions of the different TBs and N is greater than 0 and less than the total number of repeated transmissions configured.

Figure 20:
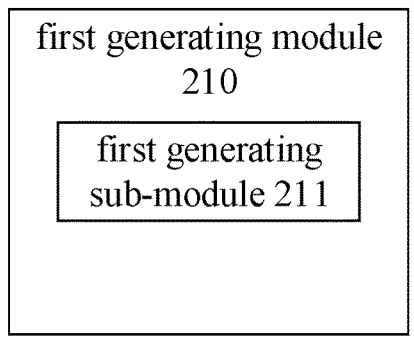
FIG. 20 is a schematic diagram of an apparatus for transmitting HARQs according to an exemplary embodiment.

In an embodiment, as illustrated in FIG. 20, the first generating module 210 includes: a first generating sub-module 211, configured to obtain the HARQ information by performing a bitwise logical AND operation on the HARQs of the plurality of different TBs.

Figure 21:
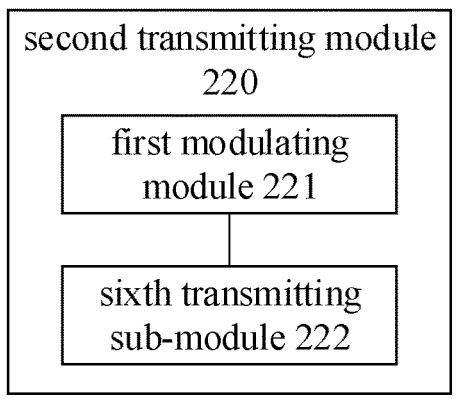
FIG. 21 is a schematic diagram of an apparatus for transmitting HARQs according to an exemplary embodiment.

In an embodiment, as illustrated in FIG. 21, the second transmitting module 220 includes: a first modulating module and a sixth transmitting sub-module.

The first modulating module 221 is configured to modulate the HARQ information by adopting BPSK.

The sixth transmitting sub-module 222 is configured to transmit the HARQ information modulated by the BPSK.

Figure 22:
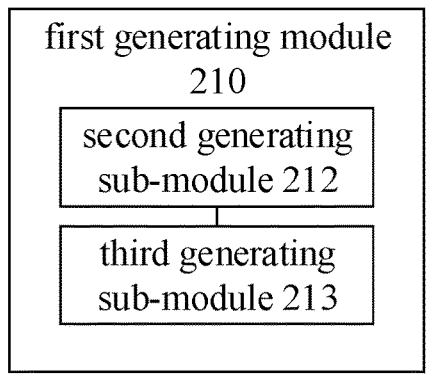
FIG. 22 is a schematic diagram of an apparatus for transmitting HARQs according to an exemplary embodiment.

In an embodiment, as illustrated in FIG. 22, the first generating module 210 includes: a second generating sub-module 212 and a third generating sub-module 213.

The second generating sub-module 212 is configured to obtain different groups of HARQs by performing a bitwise logical AND operation based on groups on the HARQs of the plurality of different TBs.

The third generating sub-module 213 is configured to obtain the HARQ information by combining the different groups of HARQs.

Figure 23:
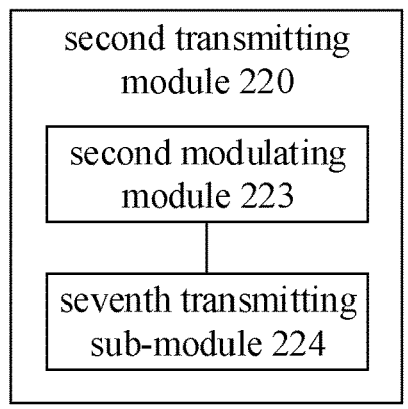
FIG. 23 is a schematic diagram of an apparatus for transmitting HARQs according to an exemplary embodiment.

In an embodiment, as illustrated in FIG. 23, the second transmitting module 220 includes: a second modulating module 223 and a seventh transmitting sub-module 224.

The second modulating module 223 is configured to modulate the HARQ information by adopting QPSK.

The seventh transmitting sub-module 224 is configured to transmit the HARQ information modulated by the QPSK.

Figure 24:
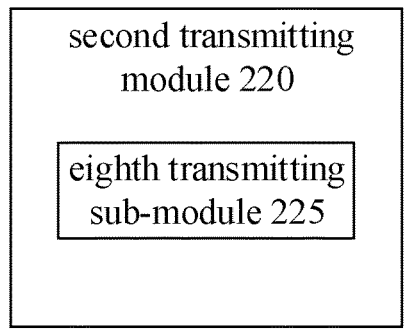
FIG. 24 is a schematic diagram of an apparatus for transmitting HARQs according to an exemplary embodiment.

In an embodiment, as illustrated in FIG. 24, the second transmitting module 220 includes: an eighth transmitting sub-module 225, configured to transmit the HARQ information by using a PUCCH, the HARQ information being transmitted on a PUCCH resource after a third time interval after transmission of the last one of the TBs is finished.

Figure 25:
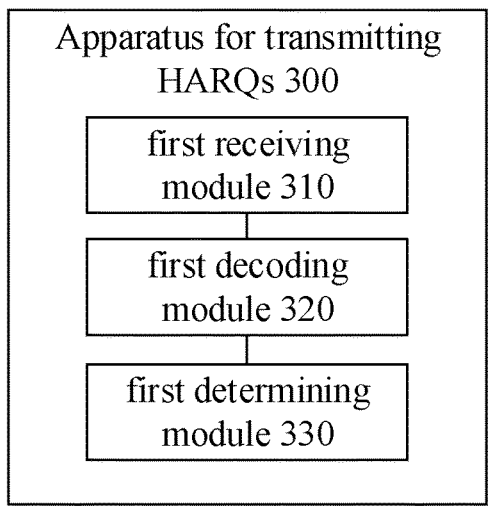
FIG. 25 is a schematic diagram of an apparatus for transmitting HARQs according to an exemplary embodiment.

The embodiments of the disclosure also provide an apparatus for transmitting HARQs. FIG. 25 is a schematic diagram of a structure of an apparatus 300 for transmitting HARQs according to some embodiments of the disclosure. As illustrated in FIG. 25, the apparatus 300 includes: a first receiving module 310, a first decoding module 320 and a first determining module 330.

The first receiving module 310 is configured to receive HARQ information that is obtained by performing predetermined encoding on HARQs of a plurality of different TBs that are alternately transmitted.

The first decoding module 320 is configured to obtain a decoding sequence by decoding the HARQ information based on a demodulating mode corresponding to the predetermined encoding.

The first determining module 330 is configured to determine demodulating states of the plurality of different TBs based on the decoding sequence.

Alternately transmitting the plurality of different TBs includes: cyclically transmitting a TB alternate transmission unit until a total number of repeated transmissions configured for each TB is satisfied, in which the TB alternate transmission unit includes N repeated transmissions of the different TBs and N is greater than 0 and less than the total number of repeated transmissions configured.

Figure 26:
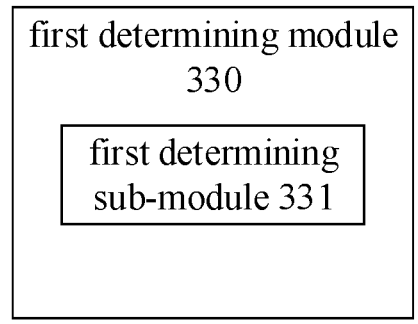
FIG. 26 is a schematic diagram of an apparatus for transmitting HARQs according to an exemplary embodiment.

In an embodiment, as illustrated in FIG. 26, the first determining module 330 includes: a first determining sub-module 331, configured to determine that the plurality of different TBs are successfully received in response to determining that the decoding sequence is a preset sequence.

Figure 27:
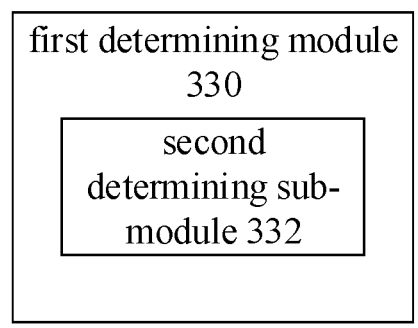
FIG. 27 is a schematic diagram of an apparatus for transmitting HARQs according to an exemplary embodiment.

In an embodiment, as illustrated in FIG. 27, the first determining module 330 includes: a second determining sub-module 332, configured to determine that at least one of the TBs is unsuccessfully demodulated in response to determining that the decoding sequence is not a preset sequence.

Figure 28:
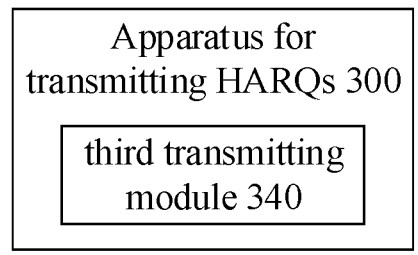
FIG. 28 is a schematic diagram of an apparatus for transmitting HARQs according to an exemplary embodiment.

In an embodiment, as illustrated in FIG. 28, the apparatus 300 includes: a third transmitting module 340, configured to retransmit the entire TB alternate transmission unit in response to at least one of the TBs being unsuccessfully demodulated.

Figure 29:
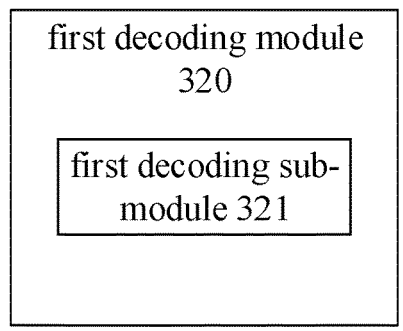
FIG. 29 is a schematic diagram of an apparatus for transmitting HARQs according to an exemplary embodiment.

In an embodiment, as illustrated in FIG. 29, the first decoding module 320 includes: a first decoding sub-module 321, configured to obtain the decoding sequence by decoding the HARQ information based on a demodulating mode of BPSK or QPSK.

In an exemplary embodiment, the first transmitting module 110, the repeated number determining module 120, the first generating module 210, the second transmitting module 220, the first receiving module 310, the first decoding module 320, the first determining module 330 and the third transmitting module 340, can be implemented by one or more central processing units (CPUs), a graphics processing unit (GPU), a baseband processor (BP), and an application specific integrated circuit (ASIC), a digital signal processor (DSP), a programmable logic device (PLD), a complex programmable logic device (CPLD), a field-programmable gate array (FPGA), a general purpose processor, a controller, a micro controller unit (MCU), a microprocessor or other electronic components. The first transmitting module 110, the second transmitting module 220 and the third transmitting module 340 can also be implemented in combination with one or more radio frequency (RF) antennas to perform the above methods.

Figure 30:
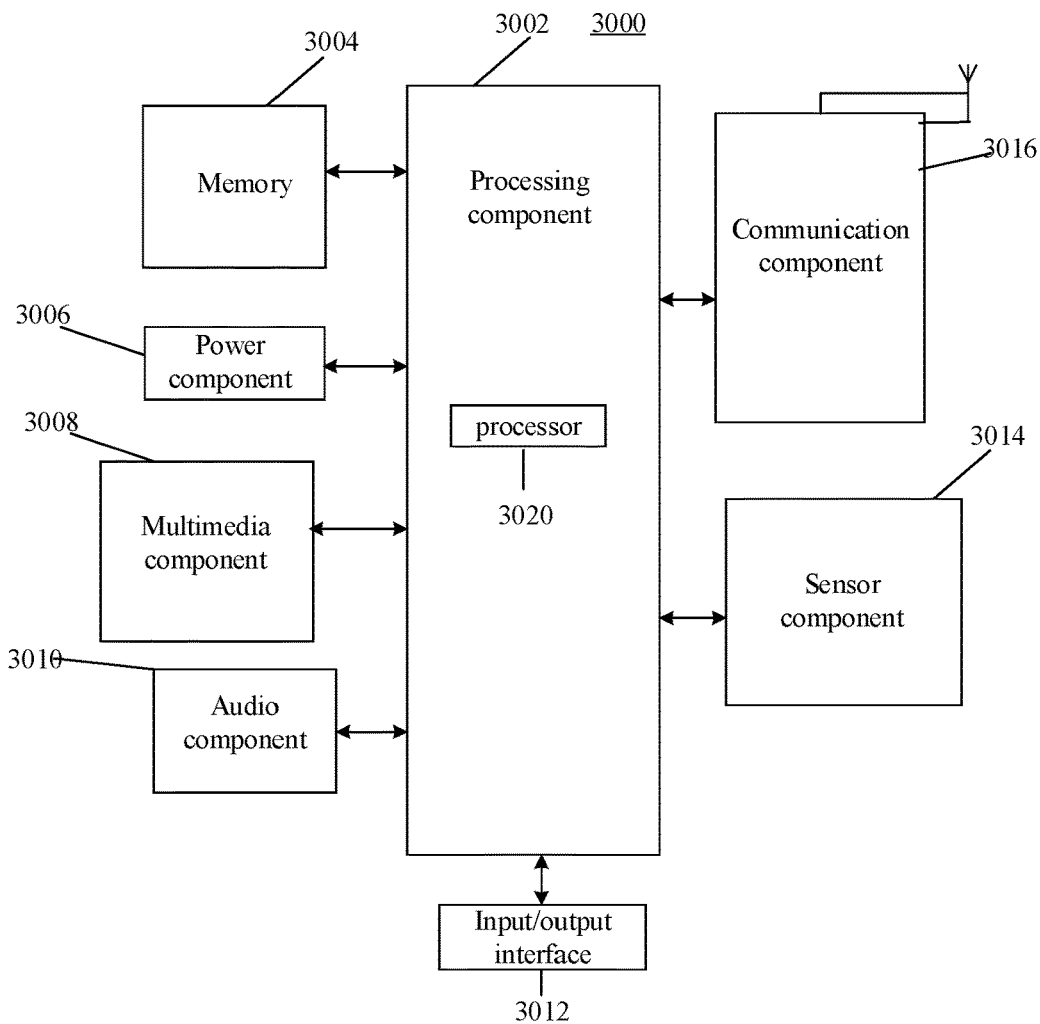
FIG. 30 is a schematic diagram of an apparatus for transmitting HARQs according to an exemplary embodiment.

FIG. 30 is a schematic diagram of an apparatus 3000 for transmitting HARQs according to an exemplary embodiment. The apparatus 3000 may be a mobile phone, a computer, a digital broadcasting terminal, a message transceiver device, a game console, a tablet device, a medical device, a fitness device and a personal digital assistant.

As illustrated in FIG. 30, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the apparatus 3000, such as the operations associated with display, telephone calls, data communications, camera operations, and recording operations. The processing component 3002 may include one or more processors 3020 to execute instructions to perform all or part of the actions in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any applications or methods operated on the apparatus 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front-facing camera and/or a rear-facing camera. When the apparatus 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the apparatus 3000. For instance, the sensor component 3014 may detect an open/closed status of the apparatus 3000, relative positioning of components, e.g., the display and the keypad, of the apparatus 3000, a change in position of the apparatus 3000 or a component of the apparatus 3000, a presence or absence of user contact with the apparatus 3000, an orientation or an acceleration/deceleration of the apparatus 3000, and a change in temperature of the apparatus 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the apparatus 3000 and other devices. The apparatus 3000 can access a wireless network based on a communication standard, such as Wi-Fi, 2G or 3G or a combination thereof. In an exemplary embodiment, the communication component 3016 receives a broadcast signal or broadcast associated information from an external broadcast management system via a broadcast channel. In an exemplary embodiment, the communication component 3016 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 3004, executable by the processor 3020 in the apparatus 3000, for performing the above method. For example, non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting Hybrid Automatic Repeat reQuests (HARQs), comprising:
    transmitting, HARQs of a plurality of different transmission blocks (TBs) that are alternately transmitted, based on different time domain resources;
    wherein, alternately transmitting the plurality of different TBs comprises: cyclically transmitting a TB alternate transmission unit until a total number of repeated transmissions configured for each TB is satisfied, in which the TB alternate transmission unit comprises N repeated transmissions of the different TBs and N is greater than 0 and less than the total number of repeated transmissions configured;

wherein transmitting the HARQs of the plurality of different TBs comprises:

transmitting the HARQs of the different TBs alternately;

wherein transmitting the HARQs of the different TBs alternately comprises: cyclically transmitting a HARQ alternate transmission unit until a total number of repeated transmissions configured for each HARQ is satisfied;

in which the HARQ alternate transmission unit comprises X repeated transmissions of each HARQ and X is greater than 0 and less than the total number of repeated transmissions configured for each HARQ;

wherein after the repeated transmissions of each TB are received, the repeated transmissions of each TB are demodulated together to obtain a demodulation result, and the demodulation result is transmitted through the HARQs.

2. The method as claimed in claim 1, wherein transmitting the HARQs of the plurality of different TBs comprises:

transmitting M repeated transmissions of the HARQ of each TB sequentially, where M is a total number of repeated transmissions of the HARQ of each TB.

3. The method as claimed in claim 1, further comprising:

determining a number of repeated transmissions of the HARQ in the HARQ alternate transmission unit based on a received high-level signaling;

or, determining a number of repeated transmissions of the HARQ in the HARQ alternate transmission unit based on a number of repeated transmissions of the TB in the TB alternate transmission unit;

or, determining a number of repeated transmissions of the HARQ in the HARQ alternate transmission unit based on a frequency hopping unit of a physical uplink control channel PUCCH, wherein the frequency hopping unit is configured to configure a number of consecutive repeated transmissions of the PUCCH in a frequency domain.

4. The method as claimed in claim 1, wherein transmitting the HARQs of the plurality of different TBs based on the different time domain resources comprises:

transmitting different HARQs by using the different time domain resources after a first time interval in which transmission of the first one of the TBs is finished;

or, transmitting different HARQs by using the different time domain resources after a second time interval in which transmission of the last one of the TBs is finished.

5. The method as claimed in claim 1, wherein transmitting the HARQs of the plurality of different transmission blocks TBs based on the different time domain resources comprises:

transmitting the HARQs of the different TBs on a physical uplink control channel PUCCH based on the different time domain resources.

6. A method for transmitting Hybrid Automatic Repeat reQuests (HARQs), comprising:

generating HARQ information by performing predetermined encoding on HARQs of a plurality of different transmission blocks (TBs) that are alternately transmitted and transmitting the HARQ information;

wherein, alternately transmitting the plurality of different TBs comprises: cyclically transmitting a TB alternate transmission unit until a total number of repeated transmissions configured for each TB is satisfied, in which the TB alternate transmission unit comprises N repeated transmissions of the different TBs and N is greater than 0 and less than the total number of repeated transmissions configured;

wherein performing the predetermined encoding on the HARQs of the plurality of different TBs that are alternately transmitted comprises:

obtaining the HARQ information by performing a bitwise logical AND operation on the HARQs of the plurality of different TBs.

7. The method as claimed in claim 6, further comprising:

modulating the HARQ information by adopting binary phase shift keying BPSK;

wherein transmitting the HARQ information comprises:

transmitting the HARQ information modulated by the BPSK.

8. The method as claimed in claim 6, wherein performing the predetermined encoding on the HARQs of the plurality of different TBs that are alternately transmitted further comprises:

obtaining different groups of HARQs by performing a bitwise logical AND operation based on groups on the HARQs of the plurality of different TBs; and obtaining the HARQ information by combining the different groups of HARQs.

9. The method as claimed in claim 8, further comprising:

modulating the HARQ information by adopting quadrature phase shift keying QPSK;

wherein transmitting the HARQ information comprises:

transmitting the HARQ information modulated by the QPSK.

10. The method as claimed in claim 6, wherein transmitting the HARQ information comprises:

transmitting the HARQ information by using a physical uplink control channel PUCCH, the HARQ information being transmitted on a PUCCH resource after a third time interval after transmission of the last one of the TBs is finished.

11. A method for transmitting Hybrid Automatic Repeat reQuests (HARQs), comprising:

receiving HARQ information that is obtained by performing predetermined encoding on HARQs of a plurality of different transmission blocks (TBs) that are alternately transmitted;

obtaining a decoding sequence by decoding the HARQ information based on a demodulating mode corresponding to the predetermined encoding; and determining demodulating states of the plurality of different TBs based on the decoding sequence;

wherein, alternately transmitting the plurality of different TBs comprises: cyclically transmitting a TB alternate transmission unit until a total number of repeated transmissions configured for each TB is satisfied, in which the TB alternate transmission unit comprises N repeated transmissions of the different TBs and N is greater than 0 and less than the total number of repeated transmissions configured.

12. The method as claimed in claim 11, wherein determining the demodulating states of the plurality of different TBs based on the decoding sequence comprises:

determining that the plurality of different TBs are successfully received in response to determining that the decoding sequence is a preset sequence.

13. The method as claimed in claim 11, wherein determining the demodulating states of the plurality of different TBs based on the decoding sequence comprises:

determining that at least one of the TBs is unsuccessfully demodulated in response to determining that the decoding sequence is not a preset sequence.

14. The method as claimed in claim 13, further comprising:

retransmitting the entire TB alternate transmission unit in response to at least one of the TBs being unsuccessfully demodulated.

15. The method as claimed in claim 11, wherein obtaining the decoding sequence by decoding the HARQ information based on the demodulating mode corresponding to the predetermined encoding, comprises:

obtaining the decoding sequence by decoding the HARQ information based on a demodulating mode of binary phase shift keying BPSK or quadrature phase shift keying QPSK.

16. A non-transitory computer-readable storage medium having an executable program stored thereon, wherein when the executable program is executed by a processor, the method for transmitting HARQs according to claim 1 is performed.

17. An apparatus for transmitting Hybrid Automatic Repeat reQuests (HARQs), comprising a processor, a memory and an executable program stored on the memory and capable of being performed by the processor, wherein when the processor executes the executable program, the method for transmitting HARQs according to claim 1 is performed.

* * * * *